United States Patent [19]

Honda

[11] Patent Number: 5,648,902
[45] Date of Patent: Jul. 15, 1997

[54] METHOD FOR MEASURING A DAMPING FORCE OF A SHOCK ABSORBER IN A SUSPENSION SYSTEM FOR A MOTOR VEHICLE AND A MEASURING SYSTEM THEREOF

[75] Inventor: Hiromoto Honda, Tokyo, Japan

[73] Assignee: HND Co., Ltd., Tokyo, Japan

[21] Appl. No.: 495,903

[22] Filed: Jun. 28, 1995

[30] Foreign Application Priority Data

Jul. 27, 1994 [JP] Japan .................................. 6-175181

[51] Int. Cl.$^6$ .................................................. G01M 17/04
[52] U.S. Cl. .............................. 364/424.034; 364/424.045; 73/11.07; 73/11.08
[58] Field of Search ........................ 364/424.03, 424.04, 364/424.05; 73/11.04, 11.07, 11.08, 11.09; 280/707

[56] References Cited

U.S. PATENT DOCUMENTS

| 3,877,289 | 4/1975 | McKenney et al. | 73/11.07 |
|---|---|---|---|
| 3,987,659 | 10/1976 | McKenney et al. | 73/11.07 |
| 4,103,532 | 8/1978 | Buzzi | 73/11.08 |
| 4,376,387 | 3/1983 | Stevens et al. | 73/11.07 |
| 5,056,024 | 10/1991 | Stuyts | 73/11.08 |

*Primary Examiner*—Gary Chin
*Attorney, Agent, or Firm*—Nikaido, Marmelstein, Murray & Oram LLP

[57] ABSTRACT

A method is provided for individually measuring a damping force of a shock absorber provided in a suspension system of a motor vehicle. A body of the motor vehicle is vibrated in a vertical direction. A vibrating acceleration of the body, and a load transmitted to a wheel of the vehicle are detected. The vibrating acceleration is integrated to produce a speed. A displacement of the body is obtained by integrating the speed. A reaction force of the spring is calculated by multiplying the displacement and a spring constant of the spring. A damping force is calculated by subtracting the spring reaction force from the transmitted load.

4 Claims, 6 Drawing Sheets

5,648,902

METHOD FOR MEASURING A DAMPING FORCE OF A SHOCK ABSORBER IN A SUSPENSION SYSTEM FOR A MOTOR VEHICLE AND A MEASURING SYSTEM THEREOF

BACKGROUND OF THE INVENTION

The present invention relates to a method for measuring a damping force of a shock absorber provided in a suspension system for a motor vehicle and a measuring system thereof, and more particularly to a damping force measuring method and a measuring system for an individual shock absorber in an assembled state in the motor vehicle.

A shock absorber is provided in a suspension system of the motor vehicle corresponding to a spring attached to each of the wheels so as to regulate spring rebound and compression. Before mounting the shock absorber in a new motor vehicle, the shock absorber is previously and solely inspected, such as measuring of the damping force. When the measured damping force is within an allowable range, the shock absorber passes the inspection, so that it can be mounted in the motor vehicle. However, when the motor vehicle is used for a long time or had an accident, the damping force of the shock absorber may be out of the allowable range. Therefore, it is necessary to change the shock absorber when the shock absorber is defective. The shock absorber is inspected at a repair shop to decide if it should be changed or not.

Japanese Patent Applications Laid-Open Nos. 50-160669, 57-111433, and 58-223035 disclose inspecting methods of shock absorbers which are inspected in assembled states in vehicle bodies.

However, in these methods, only damping quantity and damping rate are obtained as data of inspection of shock absorbers. The damping force is not measured with accuracy.

SUMMARY OF THE INVENTION

An object of the present invention is to provide a damping force measuring method of a shock absorber in a suspension system for a motor vehicle and a measuring system thereof where the damping force of the shock absorber is individually measured in an assembled state in the motor vehicle with accuracy.

According to the present invention, there is provided a method for individually measuring a damping force of a shock absorber provided in a suspension system corresponding to a spring provided for each of wheels of a motor vehicle, said method comprising the steps of, vibrating a body of the motor vehicle in a vertical direction, detecting vibrating acceleration of the body, detecting load transmitted to the wheel, integrating the vibrating acceleration to produce a speed, calculating displacement of the body by integrating the speed, calculating a spring constant from the transmitted load, calculating reaction force of the spring by multiplying the displacement and the spring constant of the spring, and calculating a damping force by subtracting the spring reaction force from the transmitted load.

The present invention further provides a system for individually measuring a damping force of a shock absorber provided in a suspension system corresponding to a spring provided for each of wheels of a motor vehicle, said system comprising, vibrator means mounted on a body of the motor vehicle for vibrating the body in a vertical direction, acceleration detector means mounted on the body for detecting vibrating acceleration of the body, load detector means disposed under the wheel for detecting load transmitted to the wheel, calculator means for calculating a damping force of the shock absorber responsive to signals from the vibrator means and the detector means.

The calculator means comprises a displacement calculator for calculating a displacement of the body responsive to the vibrating acceleration, a spring reaction force calculator for calculating a spring reaction force of the spring in accordance with the displacement and a spring constant of the spring, and a damping force calculator for calculating the damping force in accordance with the load and the spring reaction force.

These and other objects and features of this invention will become understood from the following description with reference to the accompanying drawings.

DETAILED DESCRIPTION OF THE PREFERRED EMBODIMENT

Figure 1:
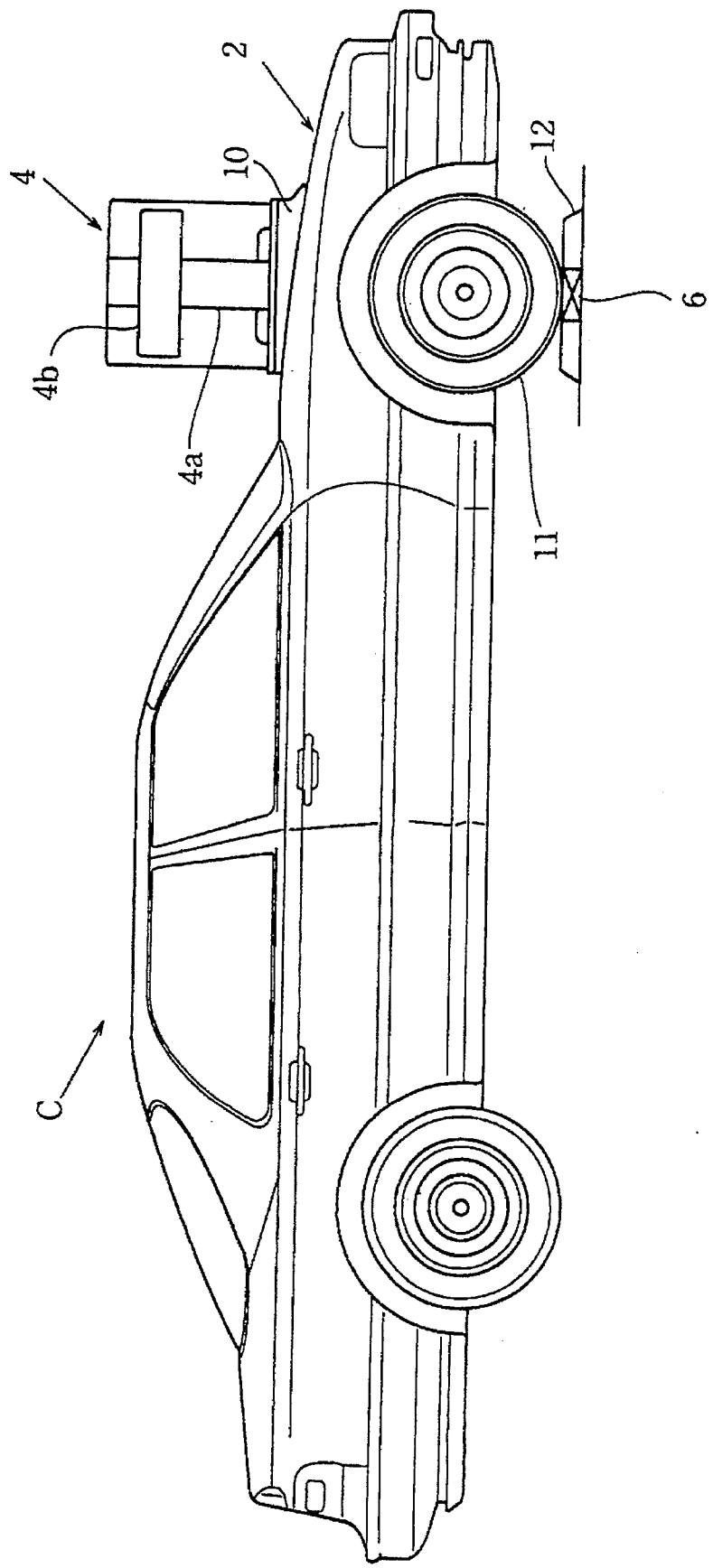
FIG. 1 is a side view showing a motor vehicle to which the present invention is applied.

Referring to FIG. 1 showing a motor vehicle C provided with a damping force measuring system according to the present invention, the damping force measuring system comprises a vibrating device 4 mounted on a hood of a body 2 of the motor vehicle C corresponding to one of four wheels 11 for vibrating the body 2. A base plate 12 having a load detector 6 is disposed under the wheel 11. In FIG. 1, a right front wheel is shown.

Figure 2:
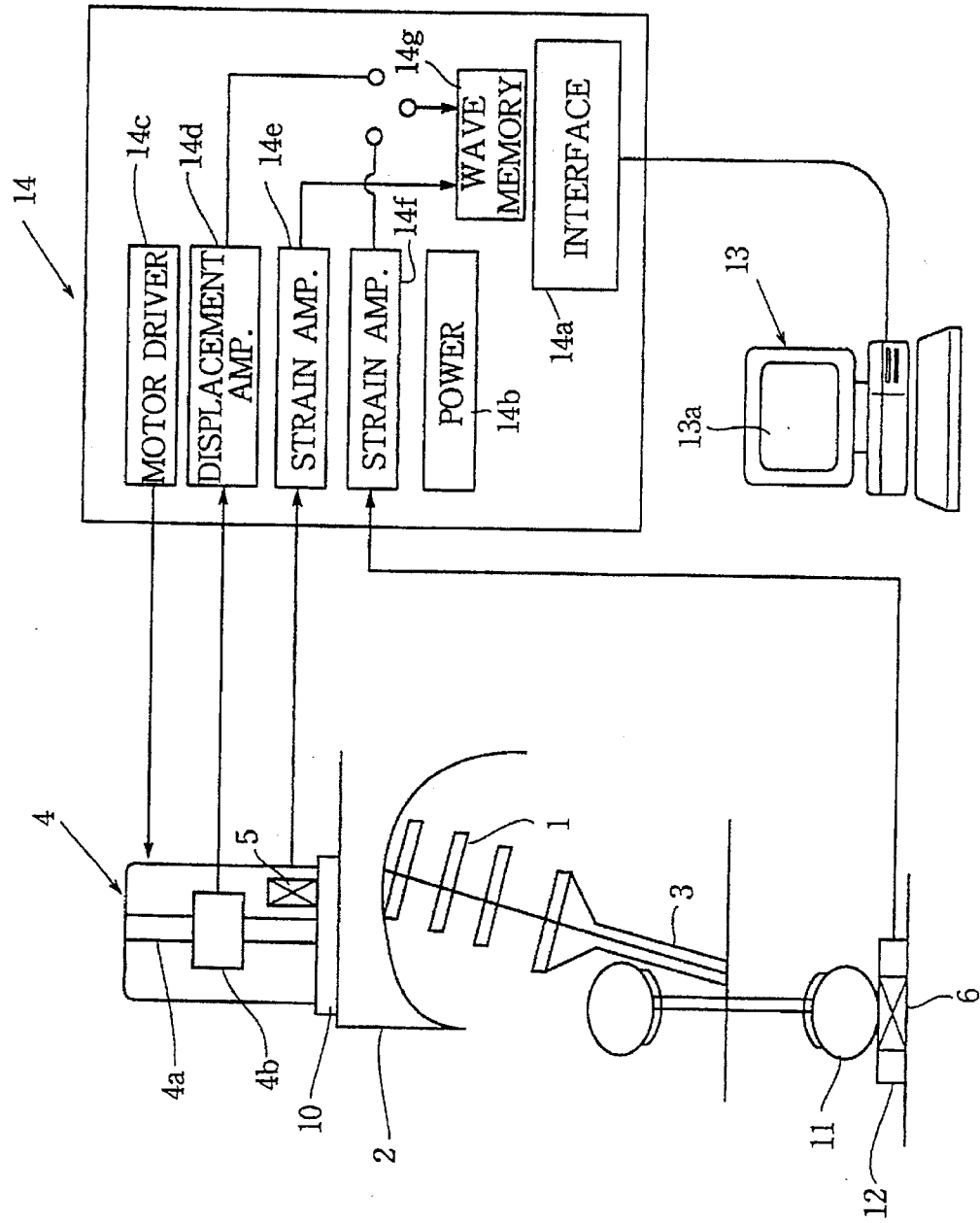
FIG. 2 is a schematic diagram showing a damping force measuring system of the present invention.

Referring to FIG. 2, in the vehicle body 2, a coil spring 1 and a shock absorber 3 of a front suspension are mounted on the wheel 11 and secured to the body 2 for suspending the body. The vibrating device 4 is mounted on the body 2 with an attachment 10 corresponding to the spring 1 and the shock absorber 3.

The vibrating device 4 comprises a guide post 4a, and a weight 4b slidably mounted on the guide post. The weight 4b is vertically reciprocated on the guide post 4a by a crank system driven by a motor (not shown) so that the vehicle body 2 is vibrated in upward and downward directions.

The weight 4b may be operated by an oil hydraulic cylinder. The cylinder has a changeover valve provided for controlling oil supplied by an oil pump.

An acceleration detector 5 is mounted on the attachment 10 adjacent to the vibrating device 4 for detecting a vibrating acceleration of the body 2 when the body is vibrated in the vertical direction. The load detector 6 of the base plate 12 is provided for detecting a load transmitted to the wheel 11.

The vibrating device 4 and detectors 5 and 6 are connected to a measuring unit 14 and a personal computer 13 having a display 13a, for controlling vibration cycles of the vibrating device 4 and processing signals detected by the detectors 5 and 6.

The measuring unit 14 comprises an input/output interface 14a connected to the computer 13, a power supply 14b, a motor driver 14c for driving the motor of the vibrating device 4 so as to control frequency and amplitude of the vibration, a displacement amplifier 14d connected to the weight 4b, a strain amplifier 14e applied with a vibrating acceleration signal detected by the acceleration detector 5, and a strain amplifier 14f applied with a load signal detected by the load detector 6. The displacement amplifier 14d and strain amplifiers 14e and 14f are connected to a wave memory 14g.

Figure 3:
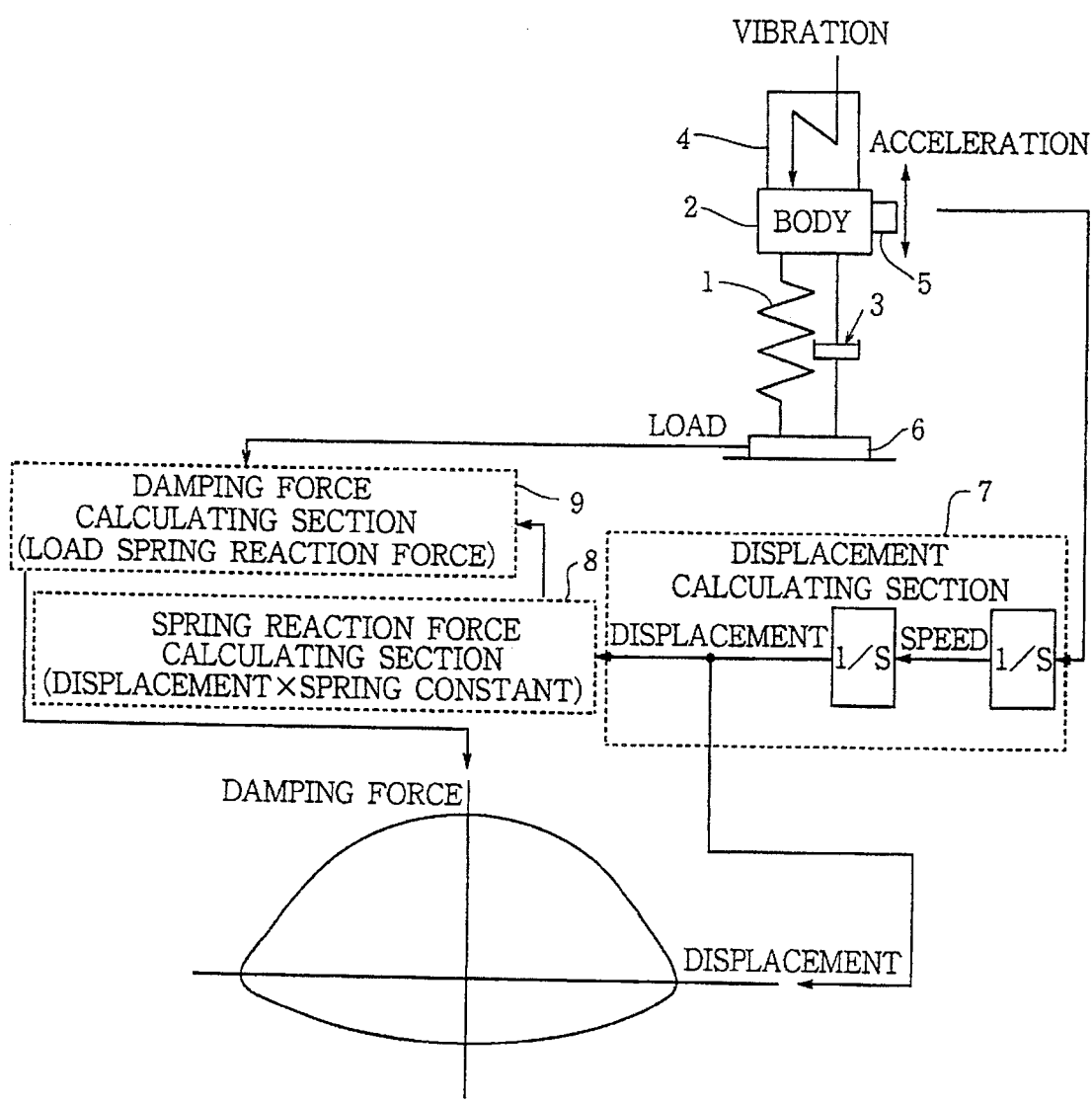
FIG. 3 is a schematic diagram showing the system.

Referring to FIG. 3, the computer 13 comprises a displacement calculating section 7, a spring reaction force calculating section 8, and a damping force calculating section 9. These calculating sections are operated in accordance with programs of the damping force measuring method.

The displacement calculating section 7 is applied with the vibrating acceleration signal from the acceleration detector 5. The acceleration signal is integrated to produce a speed signal which is further integrated to produce a displacement signal. The displacement signal is applied to the spring reaction force calculating section 8 where the displacement signal is multiplied by a spring constant of the spring 1 to produce a reaction force of the spring. The spring reaction force signal and the load signal of the load detector 6 are applied to the damping force calculating section 9 where the spring reaction force is subtracted from the load signal to produce a damping force of the shock absorber 3.

Figure 4:
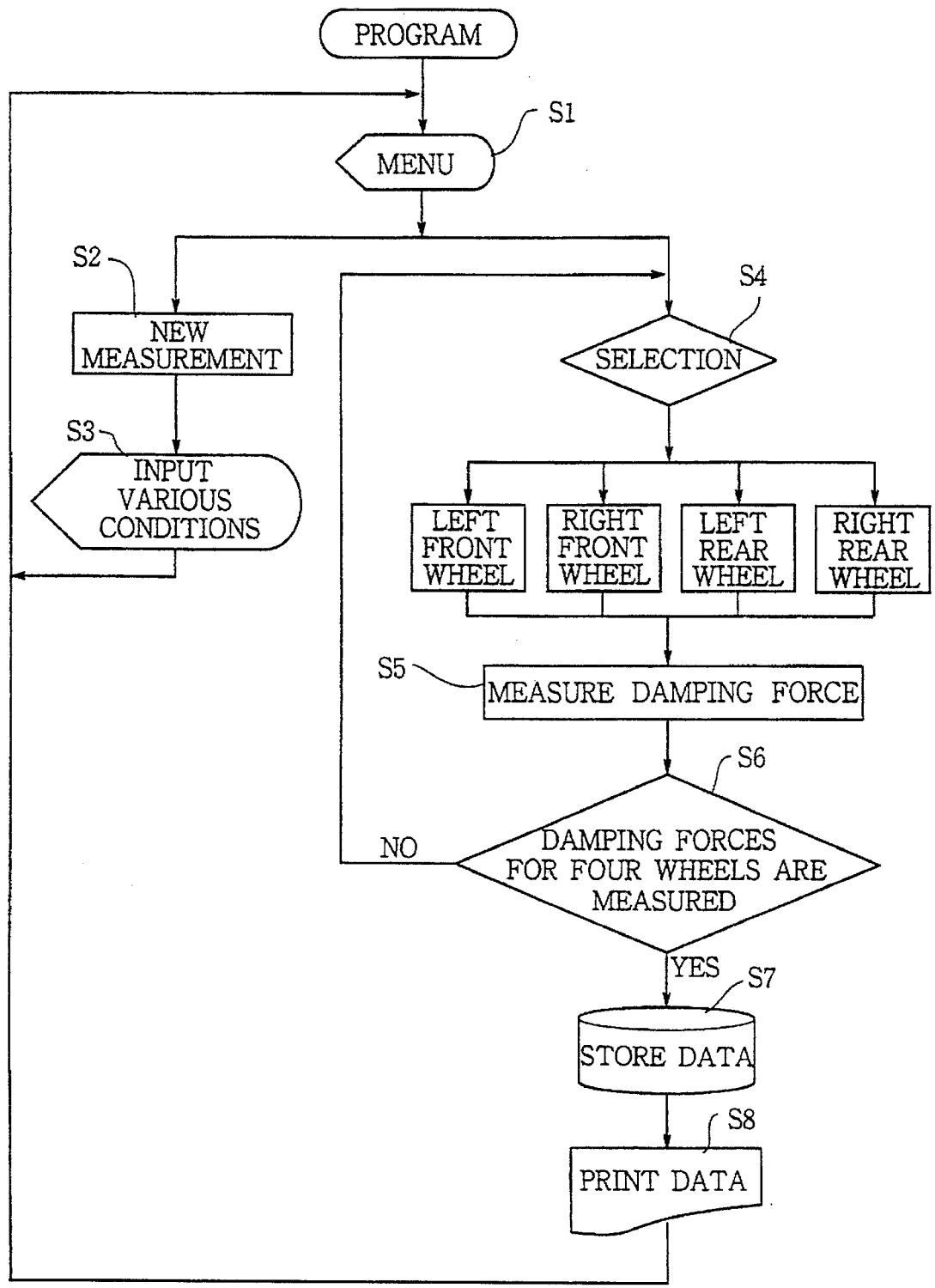
FIG. 4 is a flowchart showing an operation of the system.

The measuring method of the system will be described with reference to a flowchart of FIG. 4.

At a step S1, a menu is displayed on the display 13a whether the damping force of the shock absorber for the wheel 11 is to be newly measured or not. If yes, the program goes to a step S2 where a damping force is measured. At a step S3, various measuring conditions are input. The program returns to the step S1 and goes to a step S4 where one of the right front wheel, left front wheel, right rear wheel, and left rear wheel, corresponding to the shock absorber 3 to be measured is selected. At a step S5, the damping force is measured in accordance with a sub-routine shown in FIG. 5, which will be described hereinafter. At a step S6, it is determined whether the damping forces of the shock absorbers of four wheels are measured or not. If not, the program returns to the step S4. If yes, measured results are stored in the memory as data at a step S7. At a step S8, data stored in the memory are printed out.

Figure 5:
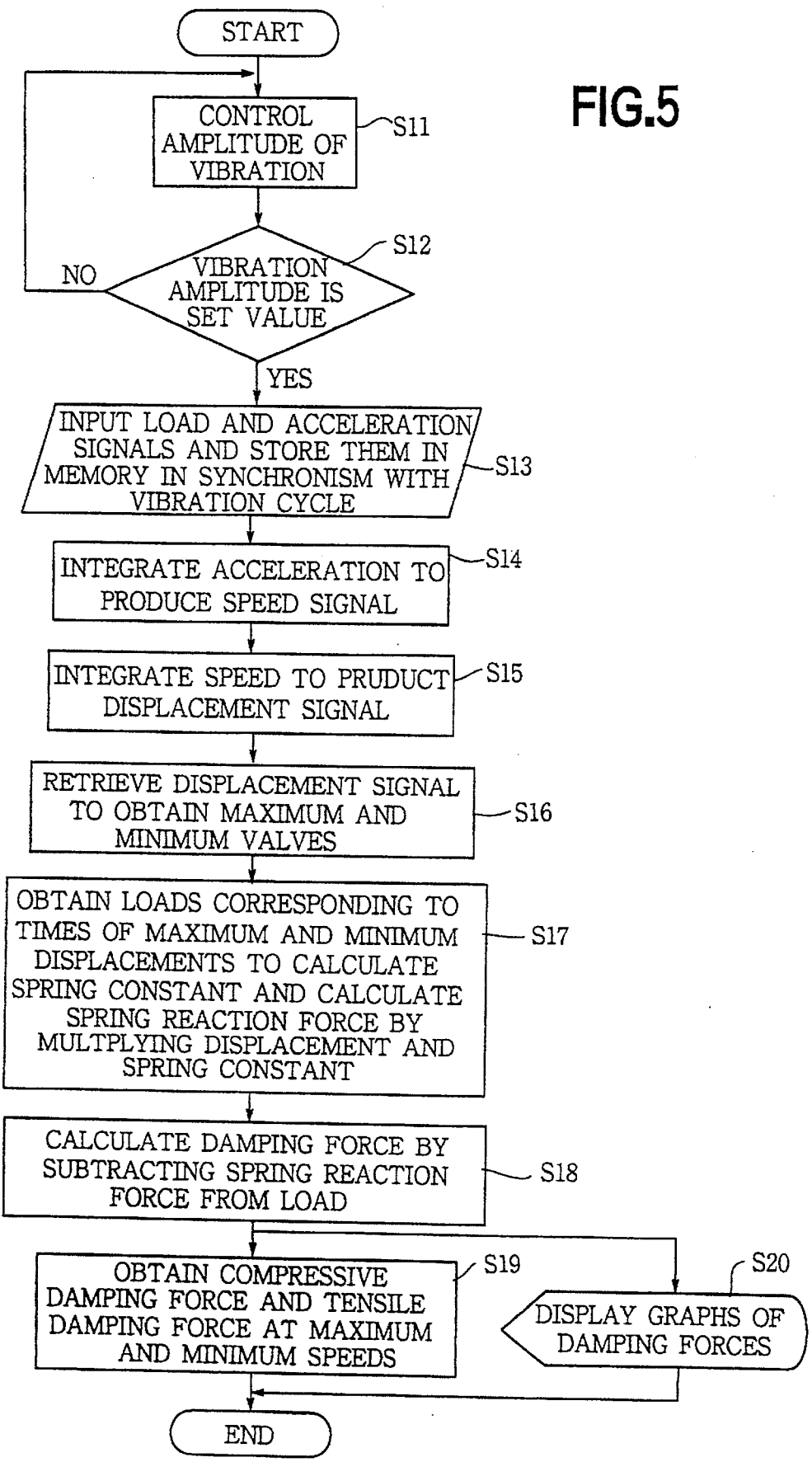
FIG. 5 is a flowchart showing a sub-routine operation of the system.

Referring to FIG. 5 showing a flowchart of the sub-routine of the step S5. At a step S11, the amplitude of the vibration is controlled. At a step S12, it is determined whether the amplitude becomes a predetermined set value or not. If not, the program returns to the step S11 where the amplitude is controlled to be converged so as to vibrate the body 2 at predetermined amplitude and cycle. If the amplitude is in the set value at the step S12, the program goes to a step S13 where the vibrating acceleration signal and the load signal are applied and stored in the memory in synchronism with the vibration cycle of the vibrating device 4.

At a step S14, the acceleration signal is integrated to be converted into the speed signal. At a step S15, the speed signal is integrated to be converted into the displacement signal.

At a step S16, the displacement signal is retrieved to obtain maximum and minimum values thereof. At a step S17, the load signals are obtained at the same times corresponding to the maximum and minimum displacement signals and the spring constant is calculated in accordance with displacement and load signals. The displacement signal is multiplied by the spring constant to calculate the reaction force of the spring.

If the spring constant is input at the step S3, steps S16 and S17 can be omitted.

Figure 6:
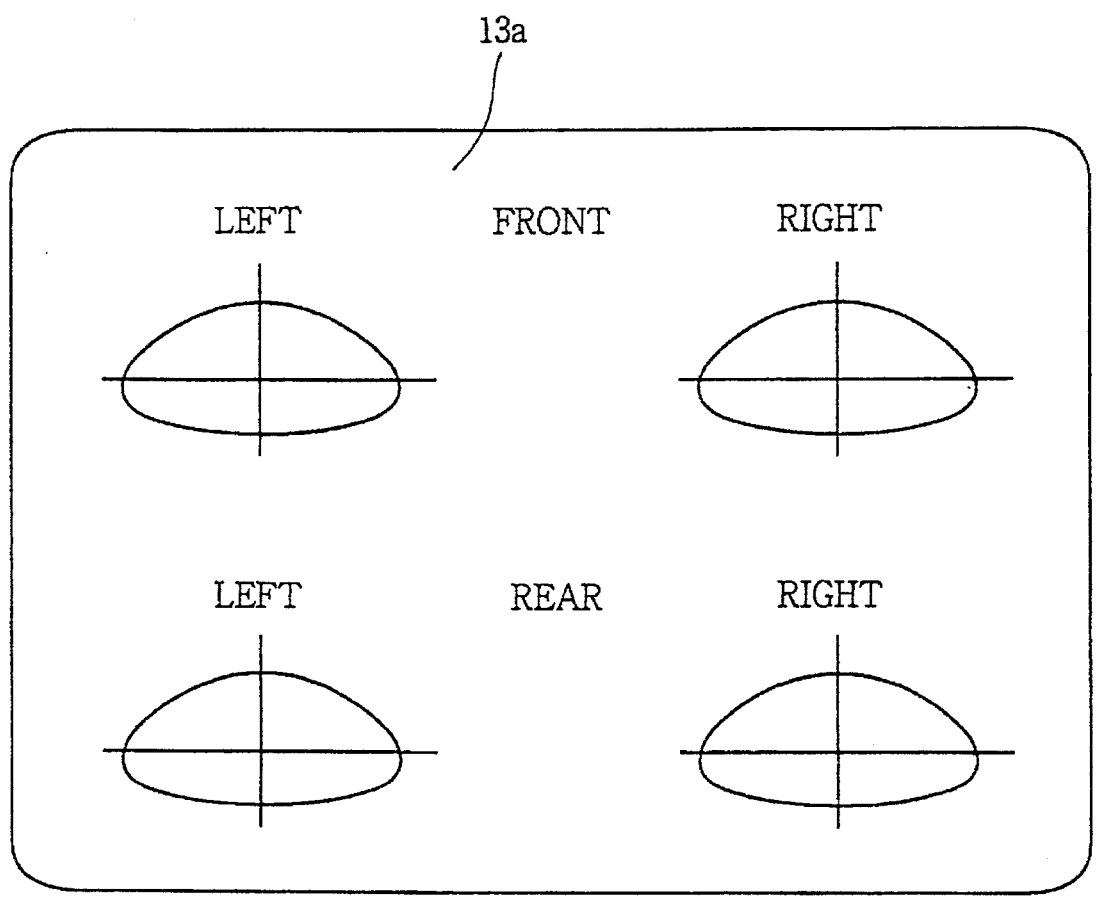
FIG. 6 is a schematic diagram showing graphs showing damping forces of four wheels.

At a step S18, the spring reaction force is subtracted from the load signal to calculate the damping force signal. At a step S19, maximum and minimum values of the speed signal are retrieved based on the damping force signal and the damping force signals at the same times corresponding to the maximum and minimum speed signals are obtained as a compressive damping force and a tensile damping force. At a step S20, damping forces of four wheels are displayed on the display 13a. In the display of FIG. 6, the ordinate represents the displacement and the abscissa represents the damping force.

In accordance with the present invention, the damping force of each shock absorber is accurately measured in the assembled state of a motor vehicle.

While the presently preferred embodiment of the present invention has been shown and described, it is to be understood that these disclosures are for the purpose of illustration and that various changes and modifications may be made without departing from the scope of the invention as set forth in the appended claims.

What is claimed is:

1. A method for individually measuring a damping force of a shock absorber provided in a suspension system corresponding to a spring provided for each of wheels of a motor vehicle, said method comprising the steps of:

vibrating a body of the motor vehicle in a vertical direction;

detecting vibrating acceleration of the body;

detecting load transmitted to the wheel;

integrating the vibrating acceleration to produce a speed;

calculating displacement of the body by integrating the speed;

calculating a spring constant from the transmitted load;

calculating reaction force of the spring by multiplying the displacement and the spring constant of the spring; and calculating the damping force by subtracting the spring reaction force from the transmitted load.

2. The method according to claim 1 wherein the spring constant is calculated from the transmitted load at maximum and minimum displacements.

3. The method according to claim 1 wherein the damping force is calculated at the maximum and minimum speeds.

4. A system for individually measuring a damping force of a shock absorber provided in a suspension system corresponding to a spring provided for each of wheels of a motor vehicle, said system comprising:

vibrator means mounted on a body of the motor vehicle for vibrating the body in a vertical direction;

acceleration detector means mounted on the body for detecting vibrating acceleration of the body;

load detector means disposed under the wheel for detecting load transmitted to the wheel; and calculator means for calculating a damping force of the shock absorber responsive to signals from the vibrator means and the detector means, the calculator means comprising a displacement calculator for calculating a displacement of the body responsive to the vibrating acceleration; a spring reaction force calculator for calculating a spring reaction force of the spring in accordance with the displacement and a spring constant of the spring; and a damping force calculator for calculating the damping force in accordance with the load and the spring reaction force.

* * * * *